US006442692B1

(12) United States Patent
Zilberman

(10) Patent No.: US 6,442,692 B1
(45) Date of Patent: Aug. 27, 2002

(54) SECURITY METHOD AND APPARATUS EMPLOYING AUTHENTICATION BY KEYSTROKE DYNAMICS

(76) Inventor: Arkady G. Zilberman, 233 Ravine Ridge Dr. N., Powell, OH (US) 43065

( * ) Notice: Subject to any disclaimer, the term of this patent is extended or adjusted under 35 U.S.C. 154(b) by 0 days.

(21) Appl. No.: 09/119,843

(22) Filed: Jul. 21, 1998

(51) Int. Cl.[7] .......... G06F 12/14

(52) U.S. Cl. .......... 713/184

(58) Field of Search .......... 340/825.31, 825.34; 382/115; 713/184, 186

(56) References Cited

U.S. PATENT DOCUMENTS

| | | | | |
|---|---|---|---|---|
| 4,218,738 A | | 8/1980 | Matyas et al. | 364/200 |
| 4,227,253 A | | 10/1980 | Ehrsam et al. | 375/2 |
| 4,264,782 A | | 4/1981 | Konheim | 178/22 |
| 4,288,659 A | | 9/1981 | Atalla | 178/22.08 |
| 4,386,266 A | | 5/1983 | Chesarek | 235/380 |
| 4,430,728 A | | 2/1984 | Beitel et al. | 364/900 |
| 4,499,462 A | | 2/1985 | Stoesser et al. | 340/825.31 |
| 4,621,334 A | * | 11/1986 | Garcia | 382/115 |
| 4,805,222 A | * | 2/1989 | Young et al. | 382/115 |
| 5,156,475 A | | 10/1992 | Zilberman | 400/472 |
| 5,193,114 A | * | 3/1993 | Moseley | 713/183 |
| 5,204,966 A | | 4/1993 | Wittenberg et al. | 395/800 |
| 5,491,752 A | | 2/1996 | Kaufman et al. | 380/30 |
| 5,638,446 A | * | 6/1997 | Rubin | 380/25 |
| 5,682,475 A | | 10/1997 | Johnson et al. | 395/188.01 |
| 5,721,780 A | | 2/1998 | Ensor et al. | 380/25 |
| 6,056,193 A | * | 5/2000 | McAuliffe et al. | 235/380 |

OTHER PUBLICATIONS

Bleha, S. et al. "Computer–Access Security Systems Using Keystroke Dynamics." IEEE Transactions on Pattern Analysis and Machine Intelligence. vol. 12 (12). pp. 1217–1222. Dec., 1990.*

Fabian, M. and A. Rubin. "Authenticaiton via Keystroke Dynamics." Proceedings of the 4th ACM Conference on Computer and Communicaitons Security. pp. 48–56. 1997.*

Gains, R. et al. "Authentication by Keystroke Timing: Some Preliminary Results." Rand Corporation. 1980.*

Joyce, R. and G. Gupta. "Identity Authentication Based on Keystroke Latencies." Communications of the ACM. vol. 33 (2). pp. 168–176. Feb. 1990.*

Robinson, V. et al. "Computer User Verification Using Login String Keystroke Dynamics." IEEE Transactions on Systems, Man, and Cybernetics. vol. 28 (2). 1998.*

De Ru, Willem and Jan Eloff, "Enhanced Password Authentication through Fuzzy Logic", IEEE Expert/Intelligent Systems & Their Applications, Nov./Dec. 1997.*

5.4 Security, Technology Forecast 198.*

Typing Carpal Tunnel Syndrome and ergonomic Keyboards (visited May 14, 1998) http://www.geocities.com/researchTriangel/5288/typing.html.

Rubin, Aviel D., et al., Web Security Sourcebook, p.73–74, 147–149.

(List continued on next page.)

*Primary Examiner*—Gail Hayes
*Assistant Examiner*—Anthony DiLorenzo
(74) *Attorney, Agent, or Firm*—Standley & Gilcrest LLP

(57) ABSTRACT

A device for verifying the identity of an individual based on a typing characteristic token. The device having said device embedded in a keyboard, said keyboard in communication with an a processing system to be secured, said device comprising: an input means for monitoring the time interval in which keys on the keyboard are depressed; a processing means in electrical communication with the input means for generating a first typing characteristic token based on the monitored time intervals; a memory means in data communication with the processing means for storing the first typing characteristic token, and wherein the processing system is adapted to compare the first typing characteristic token with a second typing characteristics token generated for a current user; and wherein the processing system denies access to the current user if the second typing characteristic does not match the stored first typing characteristic token.

18 Claims, 11 Drawing Sheets

OTHER PUBLICATIONS

BioPassword Undeniably Identified, Net Nanny Software International, Inc.

BioPassword Undeniably Identified, An Overview, Net Nanny Software International, Inc.

Net Nanny Releases Much Anticipated Alpha Version of BioPassword, Its Patentd Keystroke Dynamics Security Solution, Aug. 26, 1998.

PC Tech (visited Jun. 14, 1999) <wysiwyg://265/http://.zdnet.com/pcmag/pctech/content/18/07/tul 807.001.html>.

Biometric identification looms on landscape of network log–ins (visited Jun. 14, 1999) http://ww8.zdnet.com/pcweek/reviews/0324/24bio.html.

* cited by examiner

Table 1 - Measured time is expressed in RTU and input into the multi-channel analyzer based on the following matrix:

18

| Single key cell number ⇒ | a<br>1 | o<br>2 | e<br>3 | u<br>4 | I<br>5 | d<br>6 | h<br>7 | t<br>8 | n<br>9 | s<br>10 | p<br>11 |
|---|---|---|---|---|---|---|---|---|---|---|---|
| two keys cell number ⇓ | | | | | | | | | | | |
| a | 41 | 42 | 43 | 44 | 45 | 46 | 47 | 48 | 49 | 50 | 51 |
| o | 81 | 82 | ... | | | | | | | | |
| e | 121 | | | | | | | | | | |
| u | 161 | | | | | | | | | | |
| i | 201 | | | | | | | | | | |
| d | 241 | | | | | | | | | | |
| h | 281 | | | | | | | | | | |
| t | 321 | | | | | | | | | | |
| n | 361 | | | | | | | | | | |
| s | 401 | | | | | | | | | | |
| p | 441 | | | | | | | | | | |
| y | 481 | | | | | | | | | | |
| f | 521 | | | | | | | | | | |
| g | 561 | | | | | | | | | | |
| c | 601 | | | | | | | | | | |
| r | 641 | | | | | | | | | | |
| l | 681 | | | | | | | | | | |
| q | 721 | | | | | | | | | | |
| j | 761 | | | | | | | | | | |
| k | 801 | | | | | | | | | | |
| x | 841 | | | | | | | | | | |
| b | 881 | | | | | | | | | | |
| m | 921 | | | | | | | | | | |
| w | 961 | | | | | | | | | | |
| v | 1001 | | | | | | | | | | |
| z | 1041 | | | | | | | | | | |
| 0 | 1081 | | | | | | | | | | |
| 1 | 1121 | | | | | | | | | | |
| 2 | 1161 | | | | | | | | | | |
| 3 | 1201 | | | | | | | | | | |
| 4 | 1241 | | | | | | | | | | |
| 5 | 1281 | | | | | | | | | | |
| 6 | 1321 | | | | | | | | | | |
| 7 | 1361 | | | | | | | | | | |
| 8 | 1401 | | | | | | | | | | |
| 9 | 1441 | | | | | | | | | | |
| , | 1481 | | | | | | | | | | |
| . | 1521 | | | | | | | | | | |
| shift | 1561 | | | | | | | | | | |
| space | 1601 | | | | | | | | | | |

(continued on next page)

Table 1 (continued)

| y | f | g | c | r | l | q | j | k | x | b | m | w | v |
|---|---|---|---|---|---|---|---|---|---|---|---|---|---|
| 12 | 13 | 14 | 15 | 16 | 17 | 18 | 19 | 20 | 21 | 22 | 23 | 24 | 25 |
| | | | | | | | | | | | | | |
| 52 | 53 | 54 | 55 | 56 | 57 | 58 | 59 | 60 | 61 | 62 | 63 | 64 | 65 |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

(continued on next page)

Table 1 (continued)

| z<br>26 | 0<br>27 | ...<br>...<br>...<br>...<br>... | 9<br>36 | ,<br>37 | .<br>38 | s<br>h<br>i<br>f<br>t<br>39 | s<br>p<br>a<br>c<br>e<br>40 |
|---|---|---|---|---|---|---|---|
| | | | | | | | |
| 66 | 67 | ... | 76 | 77 | 78 | 79 | 80 |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

Table 2 - TYPING BARCODE fields for password "shendli"

| | |
|---|---|
| 3 | |
| 5 | |
| 6 | |
| 7 | |
| 9 | |
| 10 | |
| 17 | |
| 129 | |
| 257 | |
| 283 | |
| 366 | |
| 407 | |
| 685 | |

Table 3 - Example of integral TYPING BARCODE for password *"shendli"* in RTU units

| | a | o | e | u | i | d | h | t | n | s | p | r | l | q | ... |
|---|---|---|---|---|---|---|---|---|---|---|---|---|---|---|---|
| a | | | | | | | | | | | | | | | |
| o | | | | | | | | | | | | | | | |
| e | | | 4500 | | | | | | 9000 | | | | | | |
| u | | | | | | | | | | | | | | | |
| i | | | | | 5100 | | | | | | | | | | |
| d | | | | | | 3800 | | | | | | | 8200 | | |
| h | | | 9400 | | | | 4800 | | | | | | | | |
| t | | | | | | | | | | | | | | | |
| n | | | | | | 8500 | | | 4200 | | | | | | |
| s | | | | | | | 9200 | | | 4100 | | | | | |
| p | | | | | | | | | | | | | | | |
| y | | | | | | | | | | | | | | | |
| f | | | | | | | | | | | | | | | |
| g | | | | | | | | | | | | | | | |
| c | | | | | | | | | | | | | | | |
| r | | | | | | | | | | | | | | | |
| l | | | | | 9900 | | | | | | | | 4500 | | |
| q | | | | | | | | | | | | | | | |
| j | | | | | | | | | | | | | | | |

Table 4 - Excerpt from integral TYPING BARCODE matrix recorded during typing the password *"shendli"*

| | s | h | e | n | d | l | i |
|---|---|---|---|---|---|---|---|
| s | 4500 | 9200 | | | | | |
| h | | 4800 | 9400 | | | | |
| e | | | 4500 | 9000 | | | |
| n | | | | 4200 | 8500 | | |
| d | | | | | 3800 | 8200 | |
| l | | | | | | 4500 | 9900 |
| i | | | | | | | 5100 |

Table 5 - Example of final TYPING BARCODE for the password *"shendli"*

| consecutive cell numbers in multichannel analyzer | average value, RTU |
|---|---|
| 3 | 4500 |
| 5 | 5100 |
| 6 | 3800 |
| 7 | 4800 |
| 9 | 4200 |
| 10 | 4100 |
| 17 | 4500 |
| 129 | 9000 |
| 257 | 8200 |
| 283 | 9400 |
| 366 | 8500 |
| 407 | 9200 |
| 685 | 9900 |

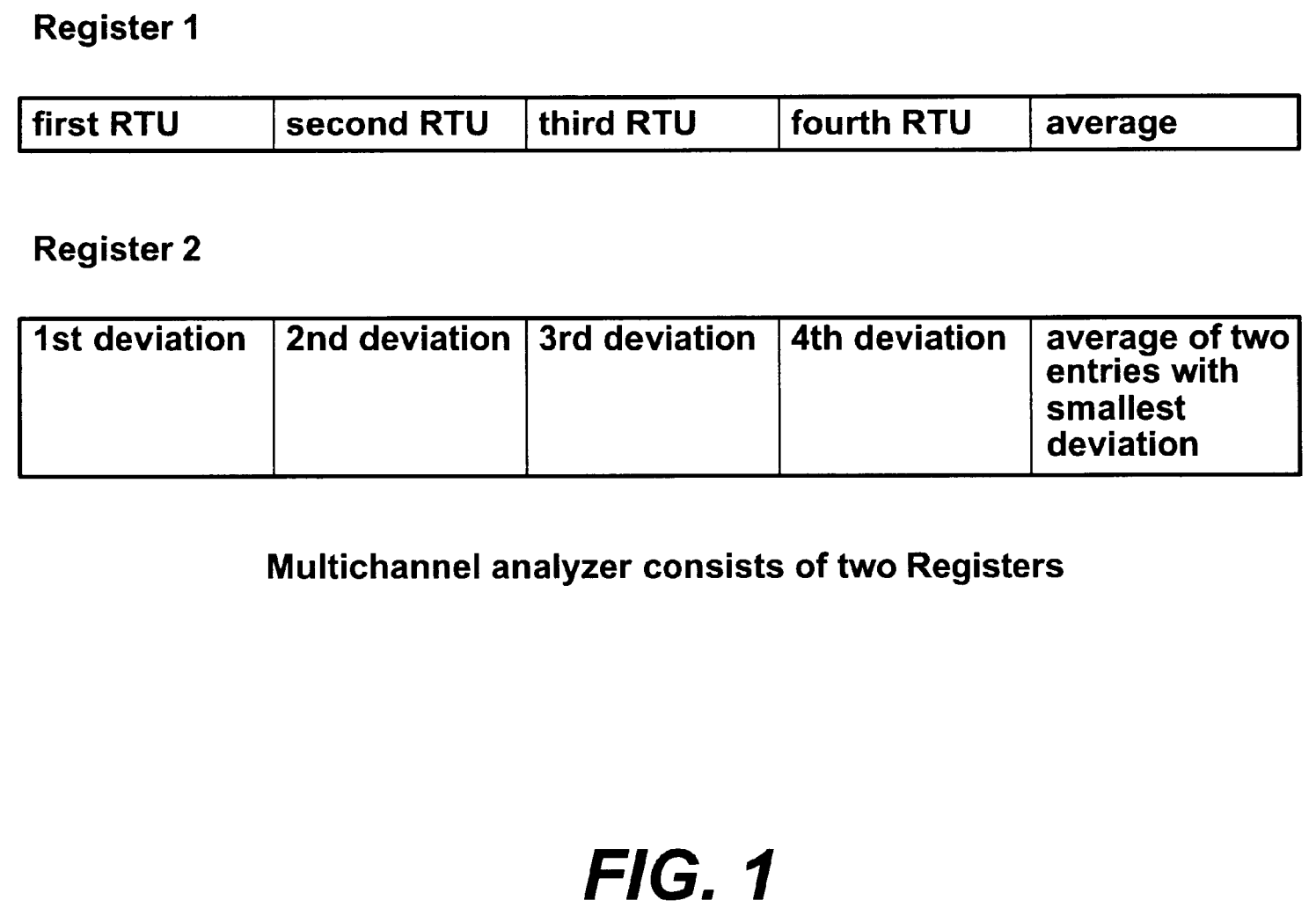

Register 1

| | | | | |
|---|---|---|---|---|
| first RTU | second RTU | third RTU | fourth RTU | average |

Register 2

| | | | | |
|---|---|---|---|---|
| 1st deviation | 2nd deviation | 3rd deviation | 4th deviation | average of two entries with smallest deviation |

Multichannel analyzer consists of two Registers

*FIG. 1*

SECURITY METHOD AND APPARATUS EMPLOYING AUTHENTICATION BY KEYSTROKE DYNAMICS

BACKGROUND OF THE INVENTION

This invention relates to authentication security systems employed in both computer and telecommunications networks and in any security system or other resources that uses a set of numbers or codes to be entered manually by a customer. More particularly, the present invention relates to an authentication security method based on keystroke dynamics.

Network security is becoming increasingly problematic with the recent explosion in computers, networks and growing TV-PC usage. With the emergence of a myriad number of "on-line" databases and services, traditional forms of network security are no longer sufficient to ensure that only authorized users or paying subscribers are able to gain access to secured networks. More and more people are discovering the advantages of shopping on the Internet. According to Forrester Research, Inc. in 1997 consumers spent online $2.4 billion, this figure is likely grow to $17.3 billion by 2001. Security of transactions is always in question. The Internet growth is restrained by consumers' concern over the potential for theft, fraud and misuse of their credit card numbers. Regardless of the security measure used, it's all about keeping the wrong people from seeing or hearing your private data.

Disadvantages of the conventional firewalls are:

Firewalls are designed to guard Intranet servers or LANs. An unauthorized access could be performed from any terminal connected to the network since the security is dependent upon the password of a particular user instead of the particular connection made to the network. Disgruntled employees and hackers can easily sneak through the network's back door without ever being caught by the firewall.

Once a user is logged-on to the computer or to the network, there is no means for periodic dynamic verification of the connection to the network which is transparent to the user and precludes attacks or misuse in cases when the qualified user leaves, or is forced to leave, his computer or terminal unattended.

Disadvantages of the conventional encryption techniques are:

Encryption cards along with the PINs can be stolen and systems which authenticate the access has no way to detect the fraudulent use of the account.

Inconvenient procedure for users—users need to enter their PIN into the encryption card first (except for SecurID), then manually type in the generated key from the encryption card display into their system upon logon.

Should users fail on any step in the multi-staged authentication procedure, whole sequences need to be repeated from scratch. Some encryption cards even lock on repeated failures.

According to recent surveys by the Computer Security Institute/FBI and Ernst & Young, nearly half of all attacks on firewalls come from 'within' the network and via dial-up connections.

The present invention is equally applicable for protecting intranet and extranet servers or LANs from inside attacks since it makes stealing or guessing a password obsolete. For example, a hacker could not gain entry since the security system of the present invention is preferably based on biometric characteristics in the form of a typing characteristics token which may be created by the user each time he or she logs-in.

This invention relates to an improved security system that inhibits eavesdropping, dictionary attacks, and intrusion into computers, workstations and other computer systems requiring password for connection validation.

The present invention is aimed to enhance security of password-related applications and connections and to add value to conventional password-based security systems by providing protection from outside threats and internally based attacks.

The programmed microcontroller of the present invention measures certain characteristics of keystroke dynamics which are independent of the typing text and, upon statistical filtering and processing, a "typing characteristic" (e.g., in the form of a token or "TYPING BARCODE") is created for the each individual.

The proposed method of security is independent of computer platform since the algorithm and associated program are preferably realized on a microcontroller embedded in a keyboard that performs the primary measurements (preferably with an accuracy of 0.001 s) and primary statistical processing and filtering and then sends the results to the associated CPU in the form of TYPING BARCODE for the purpose of authenticating the user and possibly as a local security lock or for validation of server connection. The CPU may also be provided with a program that allows receipt of the keyboard typing characteristics token and comparison with the stored typing characteristics token associated with each user (the stored typing characteristics token may be associated with a user password, terminal identification number, IP address, other network identifier or other form of user identification). Similarly, in case of a network connection, the server is provided with the program that allows it to receive a typing characteristics token and compare it with a stored token in its memory, again the stored tokens preferably being associated with issued passwords.

The present invention fulfills the following security objectives:

It adds value to a typical password routine since it precludes access to a computer system by a unauthorized user who may have access to a valid password but whose currently generated TYPEPRINT BARCODE does not match the stored "ESTABLISHED" typing characteristic token associated with the particular password.

In a security critical environment the program of the present invention could be run on a background at a controlled intervals allowing a continuous security monitoring mode. In this mode of operation the program preferably creates a TYPING BARCODE without actually recording the input text.

This type of additional password security is easy to use since it is transparent to a user, and requires no additional hardware except the microcontroller of the present invention.

The generation of the TYPING BARCODE is based on controlled studies that reveal that the unconscious directs the thinking needed to do a task automatically. When a person first learns to type, it requires very conscious effort. But when typing becomes automatic, its control is shifted over to the unconscious, so the conscious mind can attend to more challenging tasks. Typing as a subconscious process is characterized by the stability of individual characteristics.

For example, if a person routinely types his or her password, his/her separate elements of typing (time intervals for pressing and holding of separate keys) would be very stable or reproducible under normal typing conditions—when attention distraction is excluded or minimized.

Regular users of a keyboard type automatically, in a subconscious manner, i.e., typing is characterized by individual features which are as unique as person's fingerprints.

The invention relates to a microcontroller to be incorporated into a computer keyboard and an algorithm for processing user's keystroke dynamics and creating a TYPING BARCODE unique to a keyboard user. The TYPING BARCODE according to the present invention is used as the token for authentication purpose.

Accordingly, it is one object of the present invention to provide a method and apparatus for implementing security in log-in to a computer or to telecommunications network which uniquely characterizes both the network user or subscriber and the particular connection made to the network.

It is another object of the present invention to provide a method and apparatus for securing access to a network service, database or device which uses the authentication of a manually input password identifying both the specific user or subscriber and the particular connection to the network made by the user or subscriber.

It is a further object of the present invention to provide enhanced security system for critical applications requiring a constant surveillance of the computer or workstation or terminal activity. This enhanced security is provided by creating a TYPING BARCODE which is independent of inputted text and is transparent to users.

SUMMARY OF THE INVENTION

The method and programs developed for implementation of this method are based on two premises:

- Regular users of keyboard type automatically in a subconscious manner, i.e. typing is characterized by individual features which are as unique as person's fingerprints.
- The proposed microcontroller and algorithm measure certain characteristics of keystroke dynamics which are independent on the typing text and after proposed statistical filtering and processing creates a TYPEPRINT BARCODE pattern unique for each individual.

To make this technology independent of computer platform the algorithm and the program are preferably realized on microcontroller embedded in a keyboard (that preferably performs the primary measurements with an accuracy of 0.001 s) The microcontroller is preferably programmed to perform the primary statistical processing and filtering and for delivery of the results to a CPU for further processing and evaluation.

The microcontroller is preferably programmed as a multichannel analyzer which is framed on the basis of a developed matrix. In one embodiment the microcontroller has two registers with five cells in each register for recording the typing information (preferably in reversed time units (RTU)).

As discussed, the TYPING BARCODE adds value to the password routine as it would deny access to a user using a correct password whose TYPING BARCODE does not match one recorded for the particular password.

The algorithm preferably incorporates a controlled filter that cuts-off keystroke dynamics, for example, with RTU values less than 500 and data with the deviation values more than the preset value (default value is 20%).

The algorithm program of the present invention could be embedded into any security system that uses a set of numbers or codes to be entered manually by a customer. For example, cellular phones, ATM machines, programs performing financial transactions on Internet, or car locking devices, etc.

In a security critical environment the program of the present invention could be run on a background at a controlled intervals allowing a continuous security monitoring mode.

Since the proposed method of computer and other resources security can reliably generate a unique character sequence, (e.g., TYPING BARCODE or token), preferably numeric, for every human being based on his/her keystroke dynamics, the sequence may be used as a seed in the encryption key generation.

The microcontroller embedded in a keyboard may be supplied during manufacturing, or programmed, with the unique identification number which is sent to a CPU or to a server in case of network communication along with the generated typing characteristics token of the user. In one embodiment, the token is generated during the log-in procedure. In such case, the entered password is used for one form of validation while the generated token is used as another form of identification, additionally a microcontroller unique identification number may be used for identifying the particular connection to the network.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

Table 1 illustrates a table where measured time is expressed in RTU and input into a multichannel analyzer is stored as a matrix comprising 1640 cells;

Figure 2:
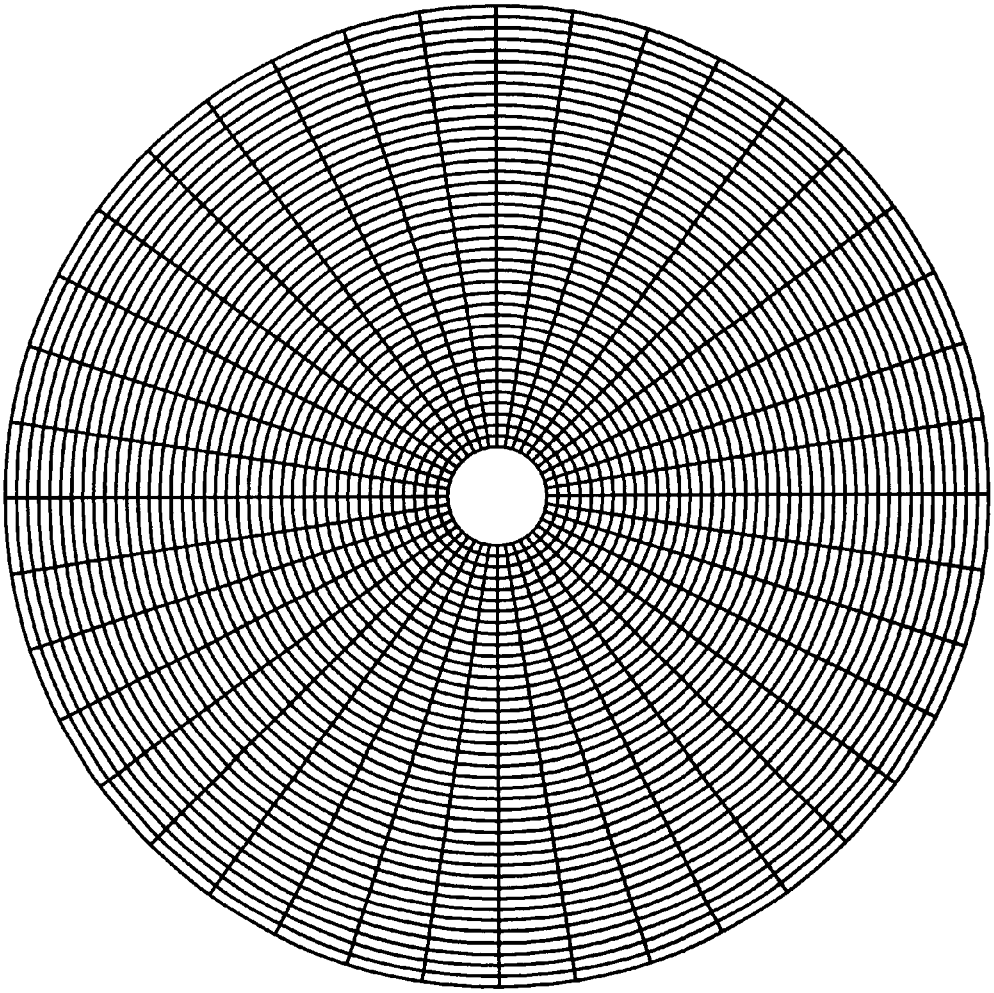
Figure 3:
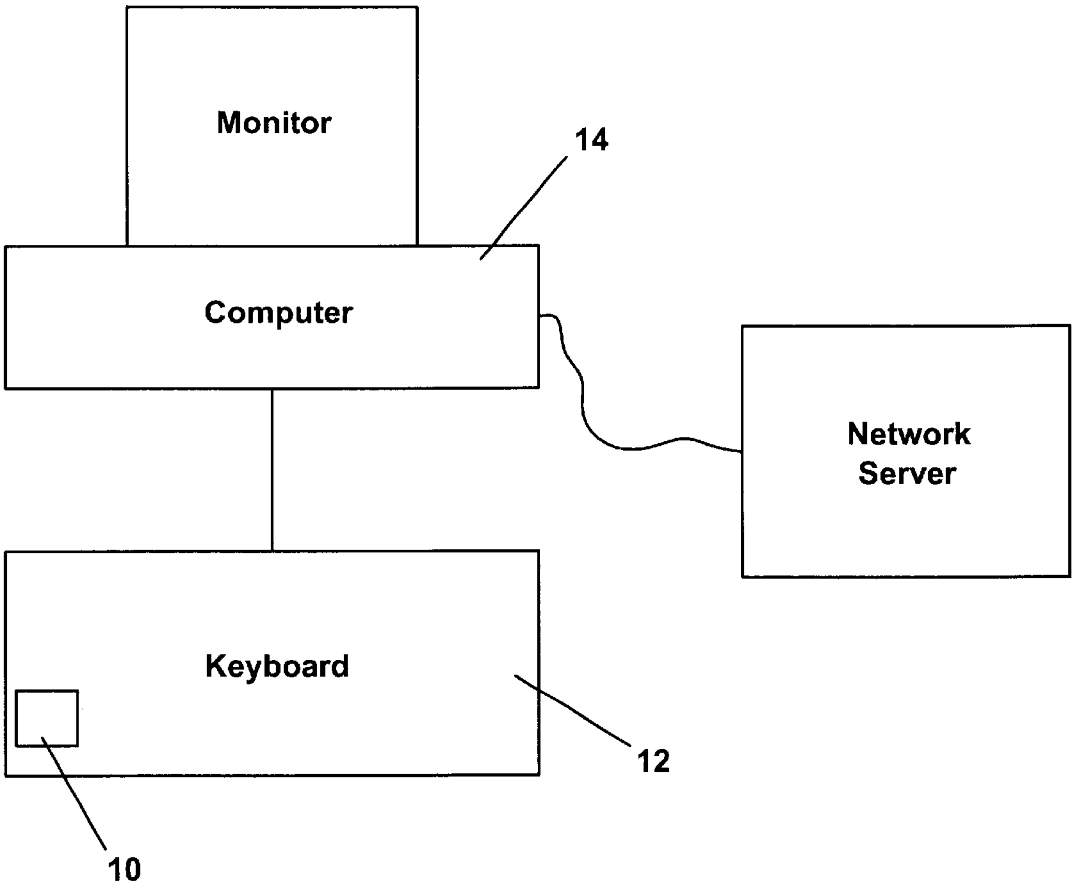
Figure 4:
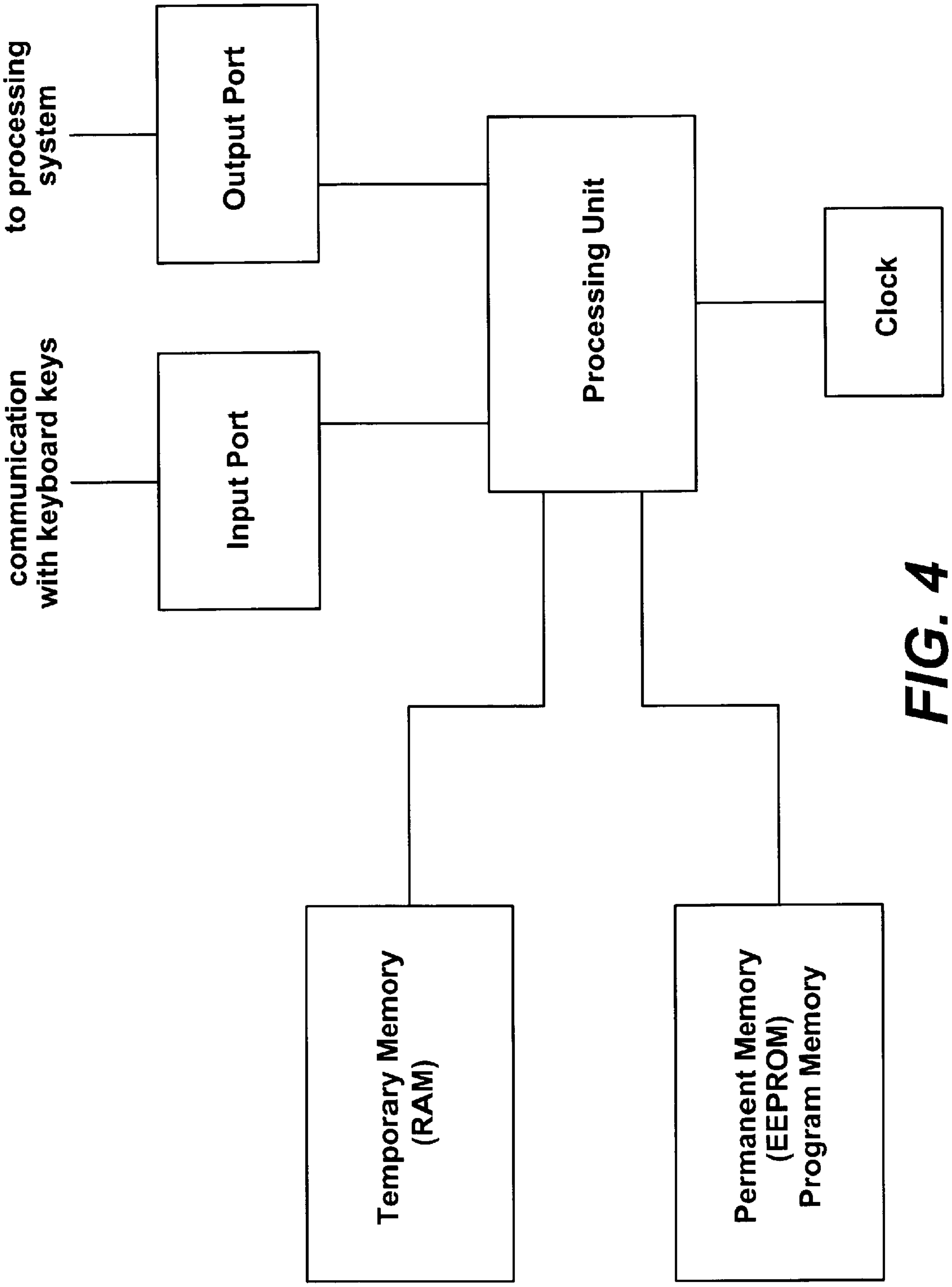

Table 2 illustrates TYPING BARCODE fields for the password “shendli”;

Table 3 illustrates an example of an integral TYPING BARCODE for password “shendli” in RTU units;

Table 4 illustrates an excerpt from an integral TYPING BARCODE matrix recorded during typing the password “shendli”;

Table 5 illustrates an example of a final TYPING BARCODE for the password “shendli”;

FIG. 1 depicts one example of a Multichannel analyzer consisting of two Registers;

FIG. 2 illustrates one graphic representation of a TYPING BARCODE;

FIG. 3 illustrates a block diagram of one embodiment of the present invention; and FIG. 4 illustrates a block diagram of one embodiment of the microcontroller of the present invention.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

FIG. 3 illustrates a block diagram of one embodiment of the present invention. In the preferred embodiment a microcontroller 10 preferably gembedded in the keyboard 12 is used to monitor the user's key strokes. FIG. 4 illustrates a block diagram of one embodiment of the microcontroller 10 of the present invention. In one embodiment, the microcontroller 10 is programmed to monitor the keystrokes (and/or time between such) and to create a typing characteristic (e.g., TYPING BARCODE or token) for the user. Accordingly, in one embodiment, the microcontroller 10 is programmed with the algorithms needed to create the TYPING BARCODE. In another embodiment, the algorithm may be programmed into the PC or network server 14 which generates the TYPING BARCODE based on the user's keystrokes. In yet another embodiment, both the microcontroller 10 and the processing system to be secured are loaded with a BARCODE generation and verification program. The microcontroller 10 preferably has multiple inputs and outputs and contains on board memory capabilities. The ports of the microcontroller 10 are in communication with the keyboard connections so as to monitor the parameters discussed below. The microcontroller 10 preferably has on-board memory capabilities for storing program code and generated TYPING BARCODES. (E.g., the ESTABLISHED TYPING BARCODES may be stored in a permanent flash memory which is maintained by an embedded battery.) The microcontroller 10 may be chosen from many commercially available microcontrollers manufactured by Motorola, Intel, or MicroChip, to name a few.

The microcontroller 10 is preferably programmed to measure certain characteristics of the user's keystroke dynamics which are independent of the typing text and which, after statistical filtering and processing, are used for creating a TYPING BARCODE, unique to each individual.

The microcontroller 10 preferably measures and records the following events:

Key-down $\epsilon 1$

Key-up $\epsilon 2$

Key-hold (e.g., key-down—key-up) $\epsilon 3$

Pause between two consecutively used keys $\epsilon 4$

The required accuracy of time measurement is preferably $x_i$: 0.001 second;

The required range of measured values is preferably: 0.05 second to 2 second;

The measured time is preferably expressed in reversed time units (RTU) $\tau=(1:x_i)\times 1000$. For example, for single keys ($\tau=(1:\epsilon 3)\times 1000$), for key combinations ($\tau=(1:\epsilon 4)\times 1000$);

The required range of measured RTU is preferably from 20000 to 500.

In the preferred embodiment, to create a TYPING BARCODE, the microcontroller 10 measures and records assessment data—a set of absolute time intervals, during which:

a user keeps a key depressed;

a user types two key combinations.

The microcontroller 10 functions as a multi-channel analyzer which measures and records the typing information into an integral TYPING BARCODE matrix 18, e.g., illustrated in Table 1. The initial ESTABLISHED TYPING BARCODE may be created by entering a set typing test or in a transparent-to-user fashion when it is created in the background while the user performs his/her usual typing work. The ESTABLISHED TYPING BARCODE matrix is preferably stored both at the microcontroller embedded in the keyboard and in the CPU of the workstation or terminal for validation reference purposes. Thus, in the preferred embodiment, validation of the TYPING BARCODE may be performed at both ends: the user's end and at the processing system, e.g., network server.

The following description describes one example of how the measured values may be used to create a TYPING BARCODE, whether that TYPING BARCODE is an ESTABLISHED BARCODE for reference purposes or a currently generated TYPING BARCODE of the current user. It is appreciated that various other embodiments may be used to accomplish the desired results in light of the following discussion.

Each unit in the integral matrix acts as a channel of the multichannel analyzer. Each channel in the matrix is preferably associated with two registers with preferably five cells for storing typing information in a predetermined fashion. For example, if a user types the letter "s" for the first time—the typing "time" in RTU is measured and stored in channel 10 of the integral matrix of Table 1. More specifically, the RTU unit is stored in the first cell of Register-1 of channel 10 (if this is a currently generated TYPING BARCODE where only one value will be used, this value will also be stored in the fifth cell of Register-1 and this value is used for comparison with the ESTABLISHED TYPING BARCODE). When a user types the letter "s" for the second time—the typing time in RTU is measured and stored in the second cell of Register-1 of channel 10 (third time—stored in the third cell, etc.). Once the first four cells of Register-1 are filled, the microcontroller 10 calculates the average RTU of the first four inputs of the letter "s" and stores the value in the last cell of Register-1 (e.g., the fifth cell in this example). In FIG. 1, this last cell is labeled "average". In addition to calculating the average, the microcontroller 10 calculates the deviation from the average for each of the four previous RTU inputs and stores the results of these calculations in the respective cells of Register-2. The average of the two stored values of Register-1 with the smallest deviations from average are stored in the last cell of Register-2. This average value is then added to the RTU of the fifth cell of Register-1 and the average of this sum is then preferably stored in the fifth channel of Register-1 (replacing the previously stored average). This value is then preferably used as the reference value in the ESTABLISHED TYPING BARCODE.

With the fifth input of the letter "s" the above described loop of measuring, storing and processing may be repeated in a similar fashion.

Thus, for the example above, with each entry (1+n4) of one symbol or two symbol combinations, shown in Table 1, the processing loop may be repeated and the average RTU, obtained in the course of processing the last batch of four inputs, may be used for upgrading the average in the corresponding channel of the integral matrix, shown in Table 1.

The above described processing algorithm is equally applicable for obtaining the individual's TYPING BARCODE based on password input (e.g., the PASSWORD TYPING BARCODE) or for obtaining the TYPING BARCODE based on input of any text, i.e. in the case of "transparent overseeing" of the user's activity in a security critical environment.

Although it is appreciated that the present invention is independent of typing text and may be performed independent of password input, the following example of the present invention describes the invention in the context of password entry. As an example, the TYPING BARCODE for password "shendli" consists of 13 barcode fields shown in Table 2.

In the course of keystroke dynamics measuring and processing, as described in the above example, the RTU values of two cells with a higher deviation from an average are ignored and have no effect on average value of the considered channel.

The typing information for each single key or a combination of two keys is recorded in its individual channel, the number of channel which is determined by the formula:

$$\Sigma iq=40xi+q$$

where i is the symbol number of the first key and q is the symbol number of the second key in recorded two key combinations.

For example, password "shendli" is measured and recorded as a set of single key typing characteristics with the channel numbers:

s=10, h=7, e=3, n=9, d=6, l=17, i=5 and two key combinations with the channel numbers:

sh=407, he=283, en=129, nd=366, dl=257, li=685

The number of TYPING BARCODE fields for a password is determined by the formula:

$$2n-1;$$

where n is the number of symbols in a password (for password shendli n=7 and the number of fields is 13).

The TYPING BARCODE table is filled with keystroke dynamics in RTU units according to the channel's number which is calculated according to the formula:

$$\Sigma iq=40xi+q$$

When the algorithm is used in the background, this procedure is repeated continuously or according to a preset schedule for user authentication.

Before any validation may be done, there is preferably a configuration of a memory or database with stored TYPING BARCODES for each user constructed preferably during the first authorization log-in procedure. At this point, each user must type his or her password so that his or her ESTABLISHED PASSWORD TYPING BARCODE is generated by a microcontroller 10 embedded in the keyboard and stored in a database (Again, the term "ESTABLISHED" refers to barcodes which are stored in memory for reference purposes. These ESTABLISHED BARCODES may be "INTEGRAL", e.g., Table 1, or a condensed version, e.g., the PASSWORD TYPING BARCODE of Table 2. The PASSWORD TYPING BARCODE takes much less memory space compared to the INTEGRAL TYPING BARCODE). The ESTABLISHED PASSWORD TYPING BARCODE is then used as a reference point for any other TYPING BARCODE subsequently generated. For example, periodic TYPING BARCODES may be generated during each log-in or in a "transparent overseeing" mode at periodic times. In one embodiment, the BIOS of the computer is configured to initiate key stroke verification at boot-up. The procedure discussed above for generating an ESTABLISHED TYPING BARCODE is preferably the same for generating the TYPING BARCODE for the current user. The currently generated TYPING BARCODE is then compared to the stored ESTABLISHED TYPING BARCODE for authentication purposes.

During primary authentication (e.g., to establish the ESTABLISHED TYPING BARCODE) the user may be asked to input his or her password a few times (for example five times). The measured RTU values are then used to determine the reproducibility of the TYPING BARCODE of the current user.

For password input, which is preferably done three times or four times, separated by space, the measured RTU values are plotted in a form of TYPING BARCODE.

The results of microcontroller measurements, both for password entry and for "transparent overseeing" the keystroke dynamics, are plotted in a form of TYPING BARCODE (e.g., Table 1) which is derived by a multichannel analyzer as described above.

To present the keystroke dynamics graphically, see FIG. 2, the TYPING BARCODE may be viewed as a set of 40 coaxial circles, each subdivided into 40 sectors with a proportional band width. The sectors are numbered clockwise and from outside to inside in 1600 numbers corresponding to Table 1.

Each sector with a recorded keystroke dynamics is preferably filled with a color or gray band as follows: the RTU=20000 is equal to 100%, any entry in each sector is recalculated into percentage. A band of the length representing the relative value (in percentage) is then graphed. In one embodiment, it is filled 100% solid, if RTU=20000 and is blank if RTU=500 (not zero, because at this value filter cuts-off the input data).

The algorithm preferably incorporates a control filter that cuts-off keystroke dynamics with the RTU values less than 500 and data with the deviation values more than a preset value (default value—20%).

In cases when the INTEGRAL TYPING BARCODE matrix is used for "transparent overseeing", the reference, or ESTABLISHED, INTEGRAL TYPING BARCODE, preferably measured and stored in the database at the microcontroller 10 embedded in the keyboard and the CPU, may contain some units or channels which would not be produced during current "transparent overseeing". In such a case, the verification is conducted based on a comparison of those channel values which are present in both the ESTABLISHED (reference) TYPING BARCODE and the currently generated TYPING BARCODE.

Verification of Typeprint Pattern

For verification of a PASSWORD TYPING BARCODE (e.g., a TYPING BARCODE created while typing in the user's password), the bars not filled with typing information and the filled (or shadowed) bars which do not have the corresponding bars in the ESTABLISHED PASSWORD TYPING BARCODE are preferably ignored: again, the comparison is preferably performed only for those TYPING BARCODE fields which are present both in the currently generated PASSWORD TYPING BARCODE and in the ESTABLISHED PASSWORD TYPING BARCODE. It means that the typing errors are ignored automatically, as well as those key combinations that were inputted in the course of typing unfamiliar words when the deviation of key combinations is more than the preset value (default 20%).

The input of password "shendli" after measuring and inserting the keystroke dynamics into the INTEGRAL TYPING BARCODE matrix is illustrated in Table 3.

For example, the original TYPING BARCODE matrix for typing the password "shendli" is illustrated in Table 4.

In the process of verification of the currently generated TYPING BARCODE, the measured value of the user input is compared to the preset corresponding value stored in the ESTABLISHED TYPING BARCODE. This difference is preferably expressed as a percentage and stored in a table, e.g., one with the same format as the ESTABLISHED TYPING BARCODE. The verification is considered valid if all the currently measured TYPING BARCODE fields are within a preset value (default is ±10%) of the stored values.

In one embodiment, the microcontroller 10 may have a unique identification number which may be sent along with the typed password and the generated TYPING BARCODE. This identification number is preferably used to identify the particular device to which the user is associated with (e.g., his or her personal computer) and may be used as a reference key for the processing system.

The microcontroller signal may be sent out once—during log-in procedure or periodically during use. The signal package preferably consists of password and TYPING BARCODE, it may also include microprocessor's unique identification number and may be encrypted using standard encryption techniques.

In the preferred embodiment, the microcontroller 10 supports the most common standard communication protocols for client—server connection, and provides solutions for alternative protocols.

The CPU (e.g., network server 14) is preferably provided with the program that allows receipt of the keyboard typing characteristics token (e.g., TYPING BARCODE). In one embodiment, the ESTABLISHED TYPING BARCODE used as the reference is stored in a databank at the processing system. In another embodiment, the ESTABLISHED TYPING BARCODE is saved at the microcontroller 10. In another embodiment, the ESTABLISHED TYPING BARCODE is saved at both locations and verification is conducted both the microcontroller 10 and the secured processing system. The comparison program is preferably configured to compare the currently generated user TYPING BARCODE with the ESTABLISHED TYPING BARCODE stored in its memory (preferably associated with passwords or through the unique microcontroller identification number). Similarly, in case of network connections, the server 14 is provided with the program that allows receipt of a typing characteristics token and, in one embodiment, an associated password, and/or a microcontroller identification number. The program, preferably loaded at the network server, compares the received data with the corresponding data stored in its databank. The currently received TYPING BARCODE is compared to the stored unique ESTABLISHED BARCODES, preferably associated with issued passwords and/or registered microcontroller identification numbers, thus allowing the server to validate the user by a unique typing characteristic of the user in conjunction with an assigned password and/or an assigned connection terminal.

For example, at some point in time, an established typing characteristics token is generated by all potential users of a secured system (e.g., through a set typing test or in real-time). These established typing characteristics are preferably saved in an ESTABLISHED TYPING BARCODE storage area. This TYPING BARCODE matrix may or may not be completely full of data. This TYPING BARCODE matrix may be stored at the processing system or at the microcontroller 10, or both. The TYPING BARCODE is preferably keyed by an assigned password, a terminal identification number (e.g., assigned to the microcontroller), an IP address, or other form of identification. Accordingly, if a password is used as one form of verification, a user is asked to input his or her password for validation purposes. Once entered, the password is sent to the associated CPU as one form of validation. As the user is inputting his or her password, the microcontroller 10 is preferably programmed to monitor the keyboard characteristics of the user as described above. Accordingly, a TYPING BARCODE is generated for the user and sent to the CPU as a second form of validation (and/or the microcontroller 10 performs the verification). In this embodiment, using the entered password as a key, an ESTABLISHED TYPING BARCODE is retrieved by the processing system and compared with the received current TYPING BARCODE. If the received password and generated TYPING BARCODE match the stored password and associated ESTABLISHED TYPING BARCODE, the user is validated and allowed access to the secured system.

As discussed above, if the initial user password and associated ESTABLISHED TYPING BARCODE are stored at the microcontroller level, this information may be passed to the processing system for comparison with the currently generated TYPING BARCODE and associated user password (or again the verification step may also be performed at the microcontroller 10 level). In another embodiment, the comparison processing may be performed at the microcontroller 10 which may send an access/deny signal to the processing system or act to lock up the keyboard 12 if access is denied. In another embodiment, the verification is performed at the microcontroller 10 and at the processing system to be secured.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

TABLE 1

The measured time is expressed in RTU and input into the multi-channel analyzer based on the following matrix:

| two keys | Single key cell number | | | | | | | | | | | | | | | | | | | |
|---|---|---|---|---|---|---|---|---|---|---|---|---|---|---|---|---|---|---|---|---|
| key cell number | a 1 | o e 2 3 | u 4 | I d 5 6 | h t 7 8 | n s 9 10 | p y 11 12 | f 13 | g c 14 15 | r l 16 17 | q j 18 19 | k 20 | x b 21 22 | m w 23 24 | v z 25 26 | 0 . . . 9 27 . . . 36 | , 37 | . 38 | shift 39 | space 40 |
| a | 41 | 42 43 | 44 | 45 46 | 47 48 | 49 50 | 51 52 | 53 | 54 55 | 56 57 | 58 59 | 60 | 61 62 | 63 64 | 65 66 | 67 . . . 76 | 77 | 78 | 79 | 80 |
| o | 81 | 82 . . . | | | | | | | | | | | | | | | | | | |
| e | 121 | | | | | | | | | | | | | | | | | | | |
| u | 161 | | | | | | | | | | | | | | | | | | | |
| i | 201 | | | | | | | | | | | | | | | | | | | |
| d | 241 | | | | | | | | | | | | | | | | | | | |
| h | 281 | | | | | | | | | | | | | | | | | | | |
| t | 321 | | | | | | | | | | | | | | | | | | | |
| n | 361 | | | | | | | | | | | | | | | | | | | |
| s | 401 | | | | | | | | | | | | | | | | | | | |

TABLE 1-continued

The measured time is expressed in RTU and input into the multi-channel analyzer based on the following matrix:

| two keys | Single key cell number | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| key cell number | a 1 | o 2 | e 3 | u 4 | I 5 | d 6 | h 7 | t 8 | n 9 | s 10 | p 11 | y 12 | f 13 | g 14 | c 15 | r 16 | l 17 | q 18 | j 19 | k 20 | x 21 | b 22 | m 23 | w 24 | v 25 | z 26 | 0 . . . 9 27 . . . 36 | , 37 | . 38 | shift 39 | space 40 |
| p | 441 | | | | | | | | | | | | | | | | | | | | | | | | | | | | | | |
| y | 481 | | | | | | | | | | | | | | | | | | | | | | | | | | | | | | |
| f | 521 | | | | | | | | | | | | | | | | | | | | | | | | | | | | | | |
| g | 561 | | | | | | | | | | | | | | | | | | | | | | | | | | | | | | |
| c | 601 | | | | | | | | | | | | | | | | | | | | | | | | | | | | | | |
| r | 641 | | | | | | | | | | | | | | | | | | | | | | | | | | | | | | |
| l | 681 | | | | | | | | | | | | | | | | | | | | | | | | | | | | | | |
| q | 721 | | | | | | | | | | | | | | | | | | | | | | | | | | | | | | |
| j | 761 | | | | | | | | | | | | | | | | | | | | | | | | | | | | | | |
| k | 801 | | | | | | | | | | | | | | | | | | | | | | | | | | | | | | |
| x | 841 | | | | | | | | | | | | | | | | | | | | | | | | | | | | | | |
| b | 881 | | | | | | | | | | | | | | | | | | | | | | | | | | | | | | |
| m | 921 | | | | | | | | | | | | | | | | | | | | | | | | | | | | | | |
| w | 961 | | | | | | | | | | | | | | | | | | | | | | | | | | | | | | |
| v | 1001 | | | | | | | | | | | | | | | | | | | | | | | | | | | | | | |
| z | 1041 | | | | | | | | | | | | | | | | | | | | | | | | | | | | | | |
| 0 | 1081 | | | | | | | | | | | | | | | | | | | | | | | | | | | | | | |
| 1 | 1121 | | | | | | | | | | | | | | | | | | | | | | | | | | | | | | |
| 2 | 1161 | | | | | | | | | | | | | | | | | | | | | | | | | | | | | | |
| 3 | 1201 | | | | | | | | | | | | | | | | | | | | | | | | | | | | | | |
| 4 | 1241 | | | | | | | | | | | | | | | | | | | | | | | | | | | | | | |
| 5 | 1281 | | | | | | | | | | | | | | | | | | | | | | | | | | | | | | |
| 6 | 1321 | | | | | | | | | | | | | | | | | | | | | | | | | | | | | | |
| 7 | 1361 | | | | | | | | | | | | | | | | | | | | | | | | | | | | | | |
| 8 | 1401 | | | | | | | | | | | | | | | | | | | | | | | | | | | | | | |
| 9 | 1441 | | | | | | | | | | | | | | | | | | | | | | | | | | | | | | |
| , | 1481 | | | | | | | | | | | | | | | | | | | | | | | | | | | | | | |
| . | 1521 | | | | | | | | | | | | | | | | | | | | | | | | | | | | | | |
| shift | 1561 | | | | | | | | | | | | | | | | | | | | | | | | | | | | | | |
| space | 1601 | | | | | | | | | | | | | | | | | | | | | | | | | | | | | | |

TABLE 2

| TYPING BARCODE fields for password shendli |
|---|
| 3 |
| 5 |
| 6 |
| 7 |
| 9 |
| 10 |
| 17 |
| 129 |

TABLE 2-continued

| TYPING BARCODE fields for password shendli |
|---|
| 257 |
| 283 |
| 366 |
| 407 |
| 685 |

TABLE 3

Example of integral TYPING BARCODE for password shendli in RTU units

| | a | o | e | u | i | d | h | t | n | s | p | r | l | q | . . . |
|---|---|---|---|---|---|---|---|---|---|---|---|---|---|---|---|
| a | | | | | | | | | | | | | | | |
| o | | | | | | | | | | | | | | | |
| e | | | 4500 | | | | | | 9000 | | | | | | |
| u | | | | | | | | | | | | | | | |
| i | | | | | 5100 | | | | | | | | | | |
| d | | | | | | 3800 | | | | | | | 8200 | | |
| h | | | 9400 | | | | 4800 | | | | | | | | |
| t | | | | | | | | | | | | | | | |
| n | | | | | | 8500 | | | 4200 | | | | | | |
| s | | | | | | | 9200 | | | 4100 | | | | | |
| p | | | | | | | | | | | | | | | |
| y | | | | | | | | | | | | | | | |
| f | | | | | | | | | | | | | | | |
| g | | | | | | | | | | | | | | | |
| c | | | | | | | | | | | | | | | |

TABLE 3-continued

Example of integral TYPING BARCODE for password shendli in RTU units

| | a | o | e | u | i | d | h | t | n | s | p | r | l | q | . . . |
|---|---|---|---|---|---|---|---|---|---|---|---|---|---|---|---|
| r | | | | | | | | | | | | | | | |
| l | | | | | 9900 | | | | | | | | 4500 | | |
| q | | | | | | | | | | | | | | | |
| j | | | | | | | | | | | | | | | |

TABLE 4

An excerpt from integral TYPING BARCODE matrix recorded during typing the password shendli

| | S | h | e | n | d | l | i |
|---|---|---|---|---|---|---|---|
| s | 4100 | 9200 | | | | | |
| h | | 4800 | 9400 | | | | |
| e | | | 4500 | 9000 | | | |
| n | | | | 4200 | 8500 | | |
| d | | | | | 3800 | 8200 | |
| l | | | | | | 4500 | 9900 |
| i | | | | | | | 5100 |

TABLE 5

Example of final TYPING BARCODE for the password shendli

| consecutive cell numbers in multichannel analyzer | average value, RTU |
|---|---|
| 3 | 4500 |
| 5 | 5100 |
| 6 | 3800 |
| 7 | 4800 |
| 9 | 4200 |
| 10 | 4100 |
| 17 | 4500 |
| 129 | 9000 |
| 257 | 8200 |
| 283 | 9400 |
| 366 | 8500 |
| 407 | 9200 |
| 685 | 9900 |

What is claimed is:

1. A device for verifying the identity of an individual based on a typing characteristic, said device embedded in a keyboard, said keyboard in communication with a processing system to be secured, said device comprising:

an input means for monitoring the time interval in which keys on said keyboard are depressed;

a processing means in electrical communication with said input means for generating a first typing characteristic based on said monitored time intervals;

a memory means in data communication with said processing means for storing said first typing characteristic, and wherein said processing system is adapted to compare said first typing characteristic with a second typing characteristic generated for a current user;

wherein said processing system denies access to said current user if said second typing characteristic does not match said stored first typing characteristic; and wherein a typing barcode in a graphic form is produced from said first typing characteristic which is used for producing a physical token to be used as a unique key for unlocking security-protected devices.

2. A device according to claim 1, further comprising:

an output means for sending said first and second typing characteristics to said processing system to be secured.

3. A device according to claim 1, wherein said processing means disables said keyboard if said first typing characteristic does not match said second typing characteristic.

4. A method for employing authentication through the use of a keyboard, comprising the steps of:

providing a first data matrix comprised of 1640 channels to store typing times for any pair of alphanumeric keys;

monitoring a first set of keystrokes on said keyboard based on predetermined parameters;

generating a first typing characteristic irrespective of inputted text for a first user based on said first set of keystrokes;

storing said first typing characteristic in said first data matrix;

providing a second data matrix comprised of 1640 channels to store typing times for any pair of alphanumeric keys;

monitoring a second set of keystrokes, based on predetermined parameters;

generating a second typing characteristic irrespective of inputted text based on said second set of keystrokes;

storing said second typing characteristic in said second data matrix;

comparing said second typing characteristic with said first typing characteristic; and determining whether a user is allowed access to a processing system based on said comparison of said second typing characteristic with said first typing characteristic.

5. A method for employing authentication through the use of an embedded microcontroller in a keyboard, comprising the steps of:

embedding a microcontroller in said keyboard;

monitoring a first set of keystrokes on said keyboard based on predetermined parameters, said monitoring performed by said microcontroller;

generating a first typing characteristic for a first user based on said first set of keystrokes;

storing said first typing characteristic in a memory;

monitoring a second set of keystrokes, based on predetermined parameters, said monitoring performed by said microcontroller;

generating a second typing characteristic based on said second set of keystrokes;

comparing said second typing characteristic with said stored first typing characteristic;

determining whether a user is allowed access to a processing system based on said comparison of said second typing characteristic with said first typing characteristic; and wherein said step of creating a typing characteristic is comprised of the steps of:

measuring typing times for inputting single alphanumeric keys on said keyboard;

measuring typing times for inputting pairs of alphanumeric keys;

storing said first and second typing characteristics in a data matrix comprised of 1640 channels to store typing times for any pair of alphanumeric keys; and wherein said first and second typing characteristics are created irrespective of inputted text.

6. A method according to claim 5, further comprising the step of:

storing said first typing characteristic in a data matrix format, wherein said data matrix format stores said typing times for inputting single alphanumeric keys and said typing times for inputting pairs of alphanumeric keys, and wherein said data matrix format has channels for predetermined single alphanumeric keys and for predetermined pairs of alphanumeric keys.

7. A method according to claim 5, wherein said first typing characteristic is stored in a memory of said processing system.

8. A method according to claim 5, wherein said first typing characteristic is stored in a memory of said processing system and wherein said method further comprises the step of transmitting said first and second typing characteristics to said processing system before performing the step of comparison.

9. A method according to claim 5 further comprising the step of:

storing a first user identifier along with said first typing characteristic.

10. A method according to claim 9, wherein said first user identifier is an assigned password of said first user.

11. A method according to claim 9, wherein said first user identifier is an assigned microcontroller identification number.

12. A method according to claim 9, further comprising the step of:

obtaining a second user identifier associated with said second typing characteristic;

comparing said second user identifier with said first user identifier;

determining whether a user associated with said second user identifier and said second typing characteristic is allowed access to said processing system based on said comparison of said second typing characteristic with said first typing characteristic and said comparison of said second user identifier with said first user identifier.

13. A method according to claim 5, wherein said first typing characteristic is formed upon creation of a first user password.

14. A method according to claim 5 wherein said processing system is a local computer.

15. A method according to claim 5, wherein said processing system is a network server.

16. A method according to claim 15, wherein said step of comparison is performed upon said establishment of communication between said network and a user terminal connected to said terminal.

17. A method according to claim 5, further comprising the step of:

allowing access to said processing system if said second typing characteristic matches said stored first typing characteristic.

18. A method according to claim 5, wherein said first typing characteristic is used as an ESTABLISHED TYPING BARCODE for said user.

* * * * *